April 8, 1924.
G. W. MOFFITT
1,489,329
FOCUSING FINDER FOR PHOTOGRAPHIC CAMERAS
Filed Dec. 31, 1921  2 Sheets-Sheet 1
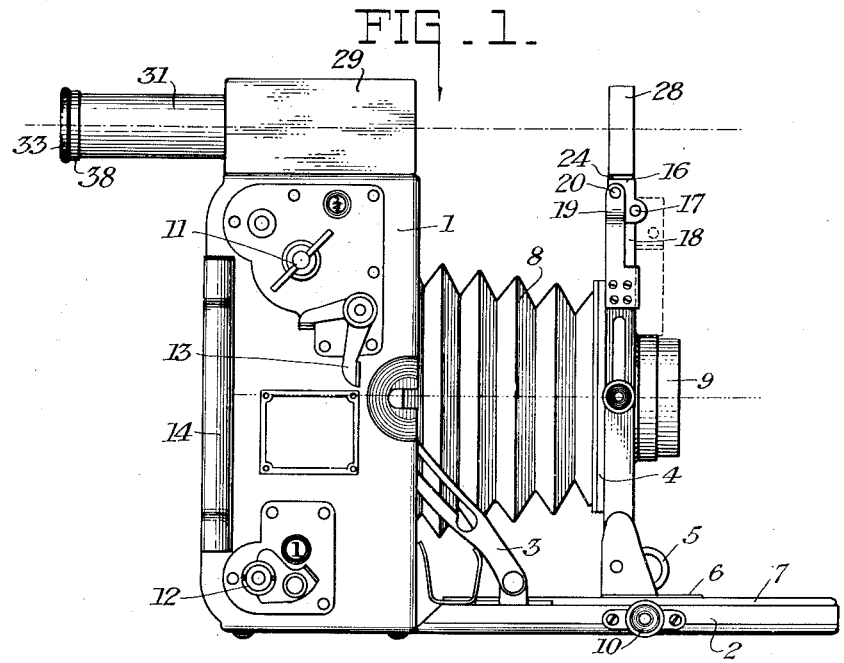
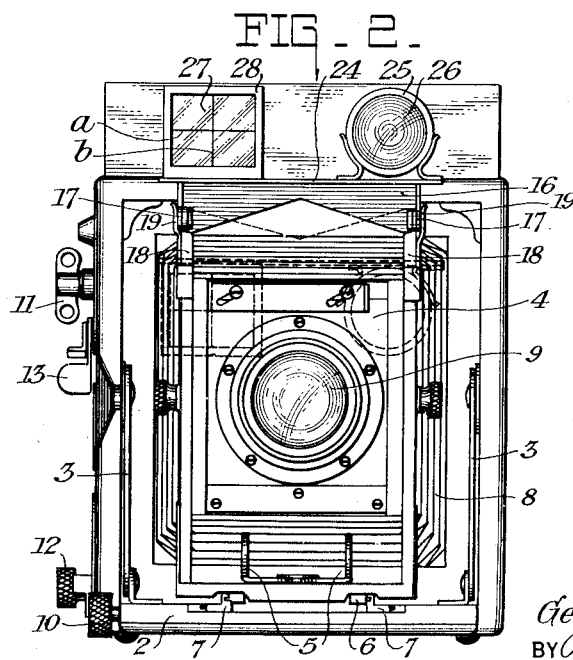
WITNESS
INVENTOR
George W. Moffitt,
BY
ATTORNEYS.

April 8, 1924.
G. W. MOFFITT
1,489,329
FOCUSING FINDER FOR PHOTOGRAPHIC CAMERAS
Filed Dec. 31, 1921   2 Sheets-Sheet 2
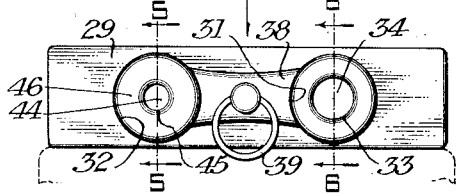
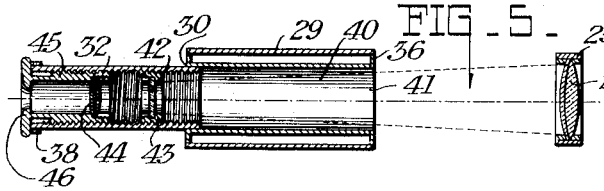
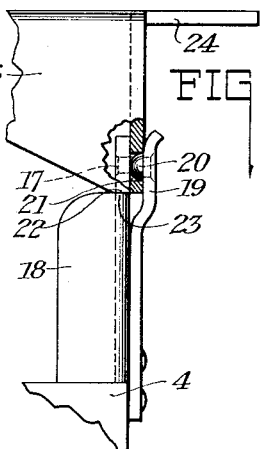
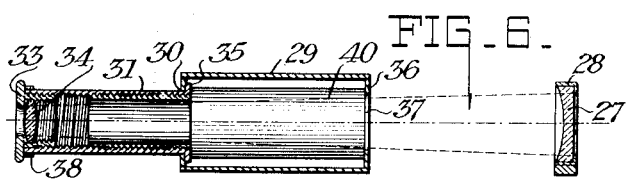
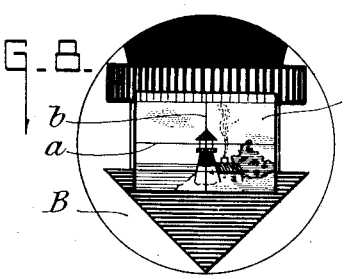
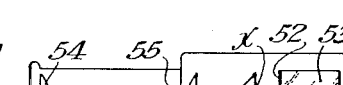
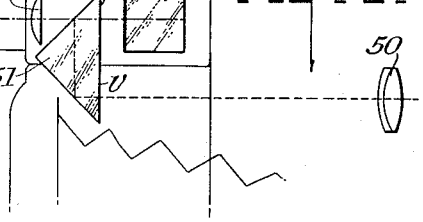
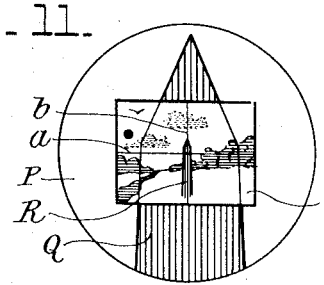
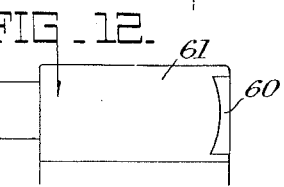
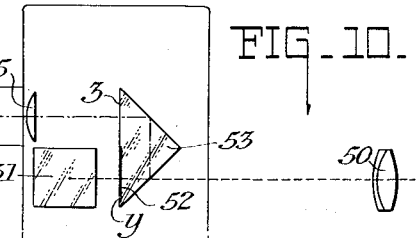
WITNESS
INVENTOR
George W. Moffitt,
BY
ATTORNEYS.

Patented Apr. 8, 1924.

1,489,329

UNITED STATES PATENT OFFICE.

GEORGE W. MOFFITT, OF ROCHESTER, NEW YORK, ASSIGNOR TO EASTMAN KODAK COMPANY, OF ROCHESTER, NEW YORK, A CORPORATION OF NEW YORK.

FOCUSING FINDER FOR PHOTOGRAPHIC CAMERAS.

Application filed December 31, 1921. Serial No. 526,423.

*To all whom it may concern:*

Be it known that I, GEORGE W. MOFFITT, a citizen of the United States of America, residing at Rochester, in the county of Monroe and State of New York, have invented certain new and useful Improvements in Focusing Finders for Photographic Cameras, of which the following is a full, clear, and exact specification.

This invention relates to photography and more particularly to focusing finders for photographic cameras. It has for its object to provide a focusing finder which can be readily attached to cameras of well-known construction or which can be built into the cameras; to provide a finder which can be used for simultaneously obtaining the field of view and the focus; to provide a shield for limiting the light entering the telescoping tubes other than that passing through the optical systems; to provide a construction which permits of folding into a relatively small space; and to provide optical systems which will enable an operator to readily distinguish the field of view from the enlarged section of the field used for focusing by means of the relative brightness of the two images. With these and other objects in view the invention resides in certain arrangements and combinations of parts such as will be hereinafter more fully described, the novel features being pointed out in the claims at the end of the specification.

In the drawings in which like reference characters denote like parts throughout:

Fig. 1, is a side elevation of a well-known type of camera equipped with a focusing finder constructed in accordance with, and illustrating one form of my invention;

Fig. 2, is a front elevation of the equipment shown in Fig. 1;

Fig. 3, is a rear elevation of the telescopes and housing;

Fig. 4, is a front view of the housing removed from the camera;

Fig. 5, is a section on line 5—5 of Fig. 3;

Fig. 6, is a section on line 6—6 of Fig. 3;

Fig. 7, is a fragmentary view of the front frame side latch;

Fig. 8, illustrates the effect resulting from the use of my focusing finder;

Fig. 9, is a diagrammatic side elevation of a different embodiment of my invention;

Fig. 10, is a plan of the system shown in Fig. 9;

Fig. 11, illustrates the effect resulting from the use of the system shown in Figs. 9 and 10; and Fig. 12, is a diagrammatic view of a modified finder optical system.

The camera body 1 has a folding bed 2 held open by braces 3. The lens board 4 is supported by a carriage 6, which may be drawn out by grips 5 along the track 7. An objective 9 is mounted on the lens board and bellows 8 connects the board to the camera body. A pinion 10 is for adjusting the focus of objective 9. In this illustration I have shown the camera as being provided with a focal plane shutter, the speeds of which are regulated by the winding key 11 and knob 12, being tripped by lever 13. The spring back 14 permits a plate or film holder to be inserted into the focal plane of the objective. All of the parts so far described are well-known.

Coming now to my invention I provide a front bracket 16 mounted to swing about a hinge 17 one side of which, 18, is affixed to the lens board 4. A spring 19 (Fig. 7) has a knob 20 on one end which is adapted to snap into aperture 21 when the bracket is erect, the shoulder 22 of bracket 16 contacting with shoulder 23 to form a stop. A similar structure is used on each side. On a flat top bar 24 there is supported on one side a cell 25 carrying a positive lens 26, which is of the same focal length as objective 9, the other side carrying a negative lens 27 in a frame 28 which is in shape similar to the picture area of the camera. As shown by dashed lines Fig. 2, this bracket folds flat against the lens board when not in use, but when erect, it projects above the camera body. It should be also noted that the space between the axes of the above mentioned lenses is taken as the interpupillary distance of the average man.

On top of the camera body, I attach a housing 29 in the form of a box, there being two circular openings 30 in the back, through each of which a telescoping tube passes. Tube 31 is in alignment with the negative lens 27 and contains a positive lens 34 in the mount 33 which screws into the main tube permitting adjustment of the low powered magnifier 34 so that the image of the field of view which is formed by lens 27 will be in proper focus. The inner end of tube 31 carries a flange 35 to limit its outward movement. The front 36 of housing 29 has a mask 37 of the proportions of finder lens 27 and of such a size as to permit the passage of light rays between lenses 34 and 27. As the inside of the housing and tube are preferably a dull black this acts as a shade and prevents much undesirable light from being reflected into lens 34. The image of the field is a brilliant one, such as is usual with direct view finders, and is in addition magnified by lens 34.

In the opposite side of box 29 there is a second telescoping tube 32, connected to 31 by a yoke 38 equipped with a ring 39 to facilitate opening and closing. This tube, 32, is coaxial with lens 26. Unlike the first tube 31, tube 32 slides in a second tube 40 terminating in a circular opening or mask 41 in the housing front plate 36. A ground glass plate 42 forms a frosted focusing screen upon which a portion of the field of view is projected by lens 26. Plate 42 is carried by a cell 43 which has a threaded connection with tube 32. A high power magnifier 44 is carried by cell 45 which terminates in an eyepiece 46 adjustable for focusing the image upon the frosted screen. This image is not as bright as the image seen in the eyepiece 31, as the frosted screen materially lessens the brilliancy of the image. This is desirable because with a little practice the operator can look through both eyepieces at once, focusing the image with eyepiece 32 by pinion 10 and at the same time including the field properly through eyepiece 31. The impression created by this process in the mind of the user is as shown in Fig. 8, where the field is brilliantly shown at A, the centering lines a—b being preferably engraved or etched on lens 26; the large circle B gives a greatly enlarged (and inverted) image of a portion of the field for focusing. Image B being less brilliant than A appears to surround image A so that both can clearly be differentiated one from the other. This feature permits the user both to view the object to be photographed and at the same time to accurately focus the camera, a distinct advantage in many different classes of work. It is, of course, possible to view only one of the two images by closing one eye, thus using only one part of the apparatus at a time. But this is not the most efficient or useful method of using my device.

The operation of taking a picture with the above described camera is as follows: The camera bed is lowered and the objective drawn out by the grips 5 until the carriage reaches its infinity position. Bracket 16 is turned about its hinge 17 until it is latched erect by springs 19. By means of ring 39, yoke 38 withdraws the telescoping tubes and the instrument is ready for use. Selecting a portion of the picture to be photographed as the feature of particular interest as the top of the lighthouse (Fig. 8), this part is centered on cross hairs a—b thus readily locating it in telescope 32. Otherwise, as the angle of view is relatively narrow, it is difficult to quickly direct the focusing telescope toward the desired object. By turning pinion 10 the focus is adjusted as desired and the shutter is tripped. These operations can be performed rapidly with ease, as the camera has only to be raised once to eye level to focus and take the picture.

I also contemplate building this focusing finder in the camera body, and also providing an optical system which will erect the focused image. Such a type is illustrated in Figs. 9 and 10 and the images made by this system are shown in Fig. 11. As the lens tube 31 may be the same in every respect as that used in the above described camera, it is not shown in the diagrams, but it is, nevertheless to be included, either in the form shown in Fig. 6, or as shown in Fig. 12, hereinafter described. The focusing optical system is different. It includes a positive lens 50, which is of approximately the focal length of the camera objective, and mounted thereover, which projects the light rays along the dashed line. As shown in Fig. 9, the rays traverse a vertical double reflecting prism 51 to a frosted surface made by grinding a surface 52 of a second horizontal double reflecting prism 53. Any desirable type of eyepiece such as the one shown consisting of two plano-convex lenses 54 and 55 is used to magnify the image formed on surface 52, and reflected along the dashed and dotted line by the surfaces of prism 53. The resultant image is erect. This system permits of considerable variation as any one surface, $v$, $x$, $y$ or $z$ can be ground to receive the image from lens 50, by selecting the one which lies at a distance from lens 50 equal to the focal length of the camera objective. While lens 50 must be close to the focal length of the camera objective, it is not necessary that it be mounted in the same plane with it. This modified construction has the advantage of providing a structure which can be built into the camera, and lens 50 need not be folded for closing the camera as in the first described embodiment of my invention. If built in, it is preferable to alter the finder by mounting the negative finder lens 60 in top of the camera in one end of box 61 containing the telescoping tubes, and use a slightly higher power lens eyepiece 62 to properly focus on this image, as shown in Fig. 12.

This modification is used just as is the first described embodiment, the chief difference being that the images both appear right side up as shown in Fig. 11, where the oblong O gives the brilliant finder image in which the chief point of interest is the monument R. The large circle P shows a less brilliant image of the monument on a much enlarged scale, Q, right side up. As before *a* and *b* are the centering lines on the finder.

Having thus described my invention, what I claim as new and desire to secure by Letters Patent is:

1. The combination with a camera body including a movable lens board, of a negative lens defining the shape of the field of view of the camera, and a positive lens carried by the lens board, a housing on the camera body, an eyepiece in alignment with the negative lens, and a frosted screen and an eyepiece in alignment with the positive lens on the lens board, there being masks interposed between the lenses carried by the housing and those carried by the lens board.

2. The combination with a camera body including a movable lens board, lenses carried on the lens board, a housing on the camera body, telescoping tubes carrying optical systems in the housing, one tube being in alignment with each lens carried by the lens board, the housing excluding light from a portion of each optical system, and including a mask of substantially the size and shape of the beam of light rays passing between the lenses on the lens board and those carried by the lens tubes.

3. As an article of manufacture, a focusing finder comprising a housing, two telescoping tubes slidable to and from the housing, a bracket, a positive and a negative lens carried by the bracket, one telescoping tube being coaxial with the positive lens and containing a focusing screen, the other telescoping tube being coaxial with the negative lens and containing a magnifier, the telescoping tubes being spaced to correspond with the average interpupillary distance.

4. As an article of manufacture, a focusing finder comprising a housing, two telescopes slidably mounted with respect to the housing, a bracket, lenses carried by the bracket, an optical system mounted in each telescope, and means including masks carried by the housing for limiting the entrance of light rays to approximately those passing between the lenses carried by the bracket and the optical systems carried by the telescopes.

5. As an article of manufacture, a focusing finder comprising two telescopes each having an optical system, one adapted to give an image of a field of view, the other system being adapted to give a different sized image of a portion of the field of view, each optical system being divided into two separate parts, and a bracket for carrying one of the parts of each of the optical systems.

6. As an article of manufacture, a finder adapted to be attached to cameras, including a camera body and a lens board movable relative thereto, comprising two optical systems, one adapted to give an image of a definite field of view, the other being adapted to give a different sized image of a portion of the field of view, each optical system being divided into two separate parts, one part of each optical system being adapted for mounting on a camera body, and the other part of each optical system being adapted for mounting upon a camera lens board.

7. In a focusing finder, the combination with a camera body, of a lens board movable to and from the camera body, two optical systems mounted on the camera, part of each system being mounted on the camera body, and part of each system being mounted on the movable lens board, a mount on the lens board for carrying parts of the optical systems, means for moving the mount to bring the optical systems into an operative position in which they may cooperate with parts of the optical systems carried by the camera body, and means for retaining the mount in its operative position.

8. In a focusing finder, the combination with a camera body, of a lens board movable to and from an inoperative position in the camera body, two optical systems each having a part carried by the camera body and a part by the movable lens board, of a movable mount carried by the lens board for supporting parts of the two systems, said mount being movable to position the parts of the optical systems to permit moving the lens board to its inoperative position in the camera body.

9. In a focusing finder, the combination with a camera body, of a lens board movable to and from the camera body, a folding mount carried by the lens board, an optical system carried in part by the camera body and in part by the folding mount, the mount being movable to and from a position in which the optical system is in position for use, and a latch for holding the folding mount in one position.

10. In a focusing finder, the combination with a camera body, of a lens board movable to and from the camera body, an objective carried by the lens board, optical systems carried partly by the camera body and partly by the lens board, a hinged mount carried by the lens board and supporting lenses of the optical systems, said lenses being adapted to lie one on each side of the camera objective when the hinged mount is in folded position.

11. In a focusing finder, the combination with a camera body, of a lens board movable to and from the camera body, an objective carried by the lens board, optical systems carried partly by the camera body and partly by the lens board, a hinged mount carried by the lens board and supporting lenses of the optical systems, a spring latch adapted to retain the hinged mount in an erect position in which the lenses carried by the mount are in operative position with respect to the parts of the optical systems carried by the camera body, and means for releasing the spring latch permitting the hinged mount to fold.

Signed at Rochester, New York, this 23rd day of December 1921.

GEORGE W. MOFFITT.